2,989,162
MEANS FOR CONTROLLING THE FLOW OF WORKPIECES ALONG A CONVEYOR

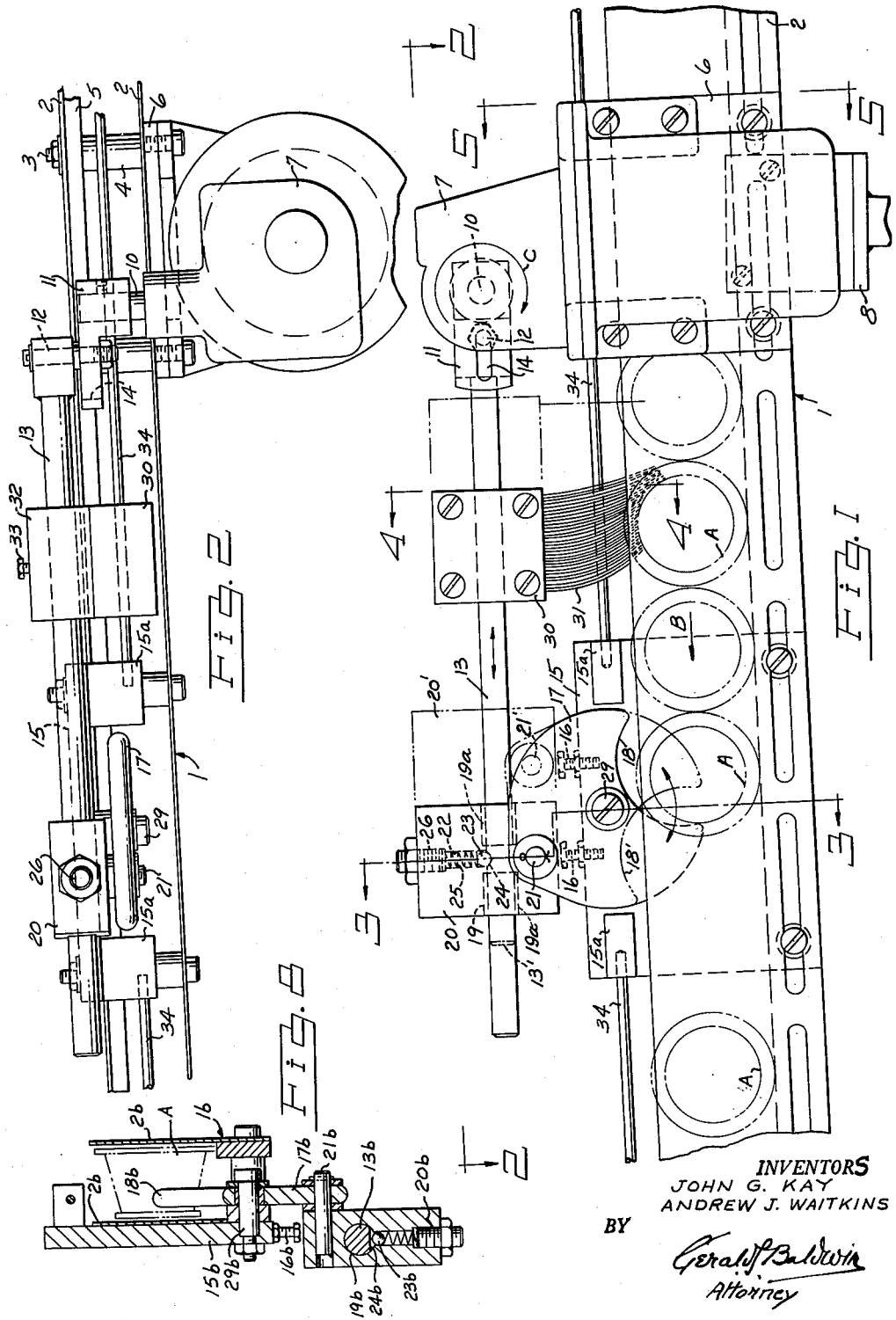
INVENTORS
JOHN G. KAY
ANDREW J. WAITKINS

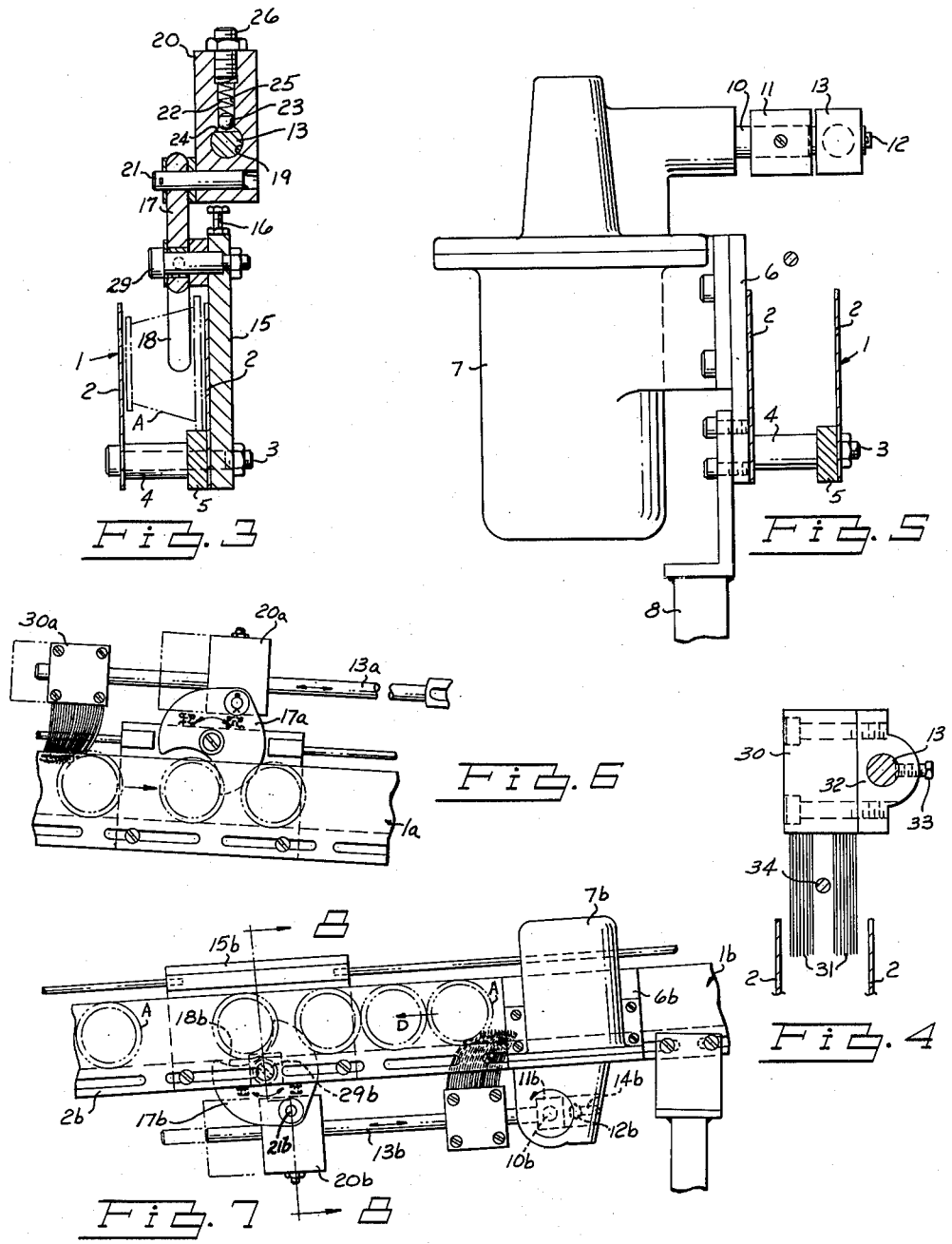

John G. Kay, Detroit, and Andrew J. Waitkins, East Detroit, Mich., assignors to F. Jos. Lamb Company, Detroit, Mich., a corporation of Michigan
Filed Dec. 18, 1959, Ser. No. 860,417
9 Claims. (Cl. 193—40)

This invention relates to improvements in means for controlling the flow of workpieces along a conveyor.

In automated installations it is a common practice for workpieces to travel from one station to the next along a conveyor, however when the distance between stations is considerable, and particularly when the conveyor consists of a gravity chute, it is often desirable both to check the speed of travel as the workpieces approach the machine or mechanism by which they are to be handled next, and also to space them apart at that time.

It is therefore an object of the invention to provide novel means for controlling the flow of workpieces along a conveyor including a mechanism by which approaching workpieces are stopped and past which they are fed one at a time.

Another object of the invention is to provide such a means for controlling the flow of workpieces along a conveyor including an oscillating cam feed by movement of which in one direction one workpiece at a time is moved past the cam; and wherein upon movement of the cam in the opposite direction it is returned to receive another workpiece; wherein the cam is actuated by a reciprocating rod; and wherein means are provided for automatically releasing the cam from the rod in the event the cam jams against a workpiece, particularly as the cam attempts to move back from its work advancing position; and wherein the releasable means re-engages the cam at least temporarily upon completion of each stroke of the rod until the cam is again free to move with the latter.

A further object of the invention is to provide such means for controlling the flow of workpieces along a conveyor wherein adjustable re-set screws are mounted beneath a block normally reciprocated by and with the rod and to which the cam is pivotally attached. Each of these re-set screws prevents rotary movement in one direction of the cam about its axis when, due to jamming of the cam, the rod travels independently of the block and continues its reciprocating movement while the block and cam remain stationary.

With these and other objects and advantages in view which will become apparent as the specification proceeds, the invention is hereinafter more fully described with the aid of the accompanying drawings, in which:

FIGURE 1 is a side elevation of the invention, and
FIGURE 2 is a plan view thereof.
FIGURES 3, 4 and 5 are sections on the lines 3—3, 4—4 and 5—5, respectively, of FIGURE 1.
FIGURE 6 is a partial side view on a reduced scale showing a modified arrangement of the brush.
FIGURE 7 shows another modified arrangement on a reduced scale wherein the workpieces are engaged from beneath by the cam, and
FIGURE 8 is an enlarged section on the line 8—8 of FIGURE 7.

Referring to FIGURES 1 to 5, inclusive, 1 designates a conveyor consisting in the present instance of gravity chuting as shown in Patent No. 2,815,841, and includes parallel side walls 2 held in spaced relation by bolts 3 having spacers 4 thereon. Supported also by the bolts 3 intermediately of their length is a longitudinal work supporting member 5, along which workpieces A are adapted to travel. The conveyor is supported in any preferred manner—not shown. Welded or otherwise suitably secured to one of the side walls 2 is a plate 6 on which a suitable driving mechanism 7 is fixedly mounted, and fastened also to the said plate is a depending support 8. The driving mechanism 7 in this case consists of a motor driven speed reduction unit from which a horizontal drive shaft 10 projects across and above the conveyor 1. Secured on the drive shaft 10 is a crank 11, and mounted on a pin 12 projecting from the latter is one extremity of a rod 13. In order that the throw of the rod may be varied the crank 11 is longitudinally slotted at 14 so that the distance of the pin 12 from the axis of the drive shaft 10 may be adjusted.

Secured to one side wall 2 of the conveyor beneath the rod 13 adjacent its outer extremity is a vertical plate 15 through which a horizontal pin 29 extends. Mounted for oscillating movement about the axis of the pin 29 is a cam 17 having an arcuate slot 18 formed in its periphery to engage workpieces A one at a time and advance them in the direction of the arrow B, FIGURE 1.

The outer portion of the rod 13 projects through a substantially horizontal passage 19 formed through aligned bushings 19a mounted in a block 20 which is pivotally mounted on a pin 21 extending from the cam 17 parallel with the pin 29. Extending downwardly through the block 20 from its upper face to the passage 19 is an opening 22 having a ball 23 therein which normally engages a groove 24 formed transversely across the upper surface of the rod adjacent its outer extremity, so that reciprocation of the rod imparts rocking motion to the cam 17 about the pin 29. The ball 23 is pressed downwardly by a helical spring 25 in the opening 22, and the upper extremity of the spring bears against the underside of a screw 26 threaded into the upper extremity of the said opening. Thus when the crank 11 is turned through 180 degrees from its position shown in FIGURE 1 the cam is turned so that its slot 18 travels to its position indicated at 18' and the block 20 and pin 21 to their positions indicated at 20' and 21' respectively, at which time the outer end of the rod is in its position 13'. The ball normally insures that reciprocation of the rod imparts oscillating movement to the cam, but if for any cause a workpiece becomes jammed in the cam slot at either end of its stroke, as would occur for instance if the conveyor were full between the cam and its discharge end, then the rod 13 continues its reciprocating movement and the ball disengages the groove so that the cam remains stationary. Obviously each time the groove passes the ball the latter at least temporarily re-engages the groove but is forced out again when the cam is held stationary, in the case above mentioned until the portion of the conveyor to the left, FIGURE 1, is free to receive another workpiece.

It is necessary to provide means for preventing rotary movement of the cam 17 about the axis of the pin 29 when the ball 23 is disengaged from the groove 24 in the rod 13, because if rocking movement of the cam then occurred the slot 18 would no longer be angularly properly positioned at the ends of its stroke to receive or discharge a workpiece. This is accomplished by mounting re-set screws 16 in the upper surface of the plate 15 which are vertically adjustable and are set so that they are spaced just beneath the block 20, one at each end of the stroke of the latter, when the ball 23 is in engagement with the groove 24. Consequently upon disengagement of the ball from the groove the underside of the block bears against one of the re-set screws if the cam commences to turn about the axis of the pin 29. For of course jamming of the cam is only liable to occur at one end or the other of its rocking movement. Adjustment of the re-set screws 16 is provided to accomodate cams of somewhat different dimensions, just as adjustment of the throw of the crank pin 12 is provided by the slot 14 to permit variation in the movement to be imparted to the cam, as such adjustment may be required for different cams. So long as the ball 23 is engaged in the slot 24 of rod 13, the arcuate movement of the cam 17 about the axis of the pin 29, and thus also the movement of the pin 21 on which the block 20 is pivoted, is limited by reciprocation of the rod 13. Under these conditions the reset screws 16 lie beneath and clear of the block 20 at each extremity of its movement. It must, however, be borne in mind that the rod 13 is free to swing in a vertical arc about the crank pin 12; the block 20 is rotatable about the axis of pin 21; and the cam 17 from which the pin 21 projects is rotatable about the axis of pin 29 which is parallel with that of the pin 21. Therefore, if the workpieces A become jammed along the conveyor 1, preventing oscillation of cam 17, both the cam 17 and the block 20 will be held stationary while rod 13 continues to reciprocate. In this case the ball 23 disengages the slot 24 and the rod 13 continues its travel, sliding back and forth through the block 20. There is then a tendency for the block 20 to swing about the axis of the pin 21, thereby turning the cam 17 to a position where the cam slot 18 will not engage the workpieces A. However, this movement is prevented by the reset screws 16 which limit the swing of the block about its pin 21, and therefore also limit the oscillation of cam 17.

Sometimes, particularly after stoppage of the conveyor, the speed of travel of workpieces therealong towards the cam may become sluggish. So in order to keep them moving a brush 30 may be mounted on the rod 13 for movement therewith. In the present instance the brush includes resilient bristles 31, made of nylon or other suitable material, and is secured to a carrier 32 through which the rod extends. The carrier is secured to the rod as by a set screw 33. It will be noted that in the instant case the bristles are arranged in rows parallel with and adjacent opposite sides of the conveyor. This is because a retaining wire 34 is frequently provided longitudinally and substantially centrally over the conveyor to prevent workpieces jumping out if they are suddenly stopped. Lugs 15a may be provided on opposite ends of the plate 15 to which adjacent extremities of portions of the wire 34 may be secured. It will be noted that in FIGURE 1 the drive shaft 10 turns clockwise, as indicated by the arrow C, and consequently more pressure is exerted by the brush upon the workpieces to more them towards the cam upon the outward stroke of the rod than is exerted upon them to move them in the opposite direction when the rod is on its return stroke, because during its outward stroke the intermediate portion thereof is lower than during its return stroke.

In the modification shown in FIGURE 6 the conveyor 1a is shown downwardly inclined from beneath the cam 17a towards the end of the rod 13a connected to the crank—not shown. In this instance the rod extends somewhat farther beyond the block 20a and provides room outwardly of the block for mounting a brush 30a thereon.

In the modification shown in FIGURES 7 and 8, inclusive, the cam engages the workpieces from beneath instead of from above as heretofore shown, otherwise the construction and operation of the mechanism is the same as that already shown in FIGURES 1 to 5.

A plate 6b is secured to one side of the conveyor 1b on which an inverted drive mechanism 7b is mounted. Secured upon a drive shaft 10b projecting from the drive mechanism is a crank 11b which is again longitudinally slotted at 14b for a crank pin 12b to pass through and engage a rod 13b.

Fixedly secured to the conveyor about the outer extremity of the rod 13b is another plate 15b having a pin 29b projecting therefrom on which a cam 17b having an arcuate slot 18b formed in its periphery is mounted for oscillating movement. In this case the pin 29b is positioned adjacent the bottom of the conveyor 1b and the cam projects upwardly between the side walls 2b thereof. Mounted on the rod 13b, and normally for reciprocation therewith, is a block 20b having a passage 19b therethrough through which the rod extends, and projecting from the cam 17b is a pin 21b which extends through the said block. The upper face of the block 20b is spaced beneath the underside of the plate 15b, and re-set screws 16b depend from and are vertically adjustable in the plate slightly above the block. The elevation of the cam slot 18b is such as to engage a workpiece A on the conveyor from beneath and move it in the direction of the arrow D, FIGURE 7, and also to arrest the travel of a workpiece approaching from the right when the said cam is turned to the position shown, FIGURE 7.

Movement of the block 20b with the rod 13b is again obtained by engagement of a spring pressed ball 23b with a transverse groove 24b formed across the rod, however when movement of the cam 17b about the pin 29b is prevented the ball disengages the groove so that while the rod continues to be reciprocated the cam remains stationary. The purpose of the set screws 16b is the same as in the construction shown in FIGURES 1 to 5.

While in the foregoing the preferred embodiments of the invention have been described and shown, it is understood that further alterations and modifications may be made thereto provided they fall within the scope of the appended claims.

What we claim is:

1. Means for controlling the flow of workpieces along a conveyor including a drive shaft mounted for rotation transversely of the conveyor, a crank on the drive shaft, a rod mounted at one extremity on the crank, a cam mounted on an axis for oscillation between opposite sides of the conveyor within the path of said workpieces, a block slidably mounted on the rod, coupling means releasably connecting the block with the rod, said block pivotally connected to the cam at a point spaced radially from the cam axis to oscillate the cam about its axis, said coupling means between the block and the rod being releasable to permit reciprocation of the rod independently of the block when the block is held by the cam against reciprocation, said cam having a slot therein adapted to receive a workpiece approaching along the conveyor upon oscillation of the cam and move the workpiece past the cam, and said cam when its slot is not positioned to receive an approaching workpiece obstructing the passage of a workpiece past it along the conveyor.

2. The combination in claim 1, wherein the coupling means between the block and the rod at one point during each stroke of the rod comes into the required position to couple the block to the rod to reciprocate therewith when the block is released by the cam for such reciprocation.

3. The combination in claim 1, wherein a brush is secured on the rod between the crank and the block for sweeping workpieces along the conveyor towards the cam.

4. The combination in claim 1, wherein a brush is secured on the rod for sweeping workpieces on the conveyor towards the cam, and the direction of rotation of the crank is such that the brush is nearer the conveyor as it moves towards the cam and farther from the conveyor as it moves away from the cam.

5. Means for controlling the flow of workpieces along a conveyor including a gravity chute, a drive shaft mounted for rotation at right angles to the chute, a crank on the drive shaft, a rod mounted at one extremity on the crank, a cam mounted on the chute for oscillation about an axis parallel with the drive shaft between opposite sides of the chute within the path of said workpieces, a block pivoted on the cam, said block being releasably coupled to the rod adjacent its opposite extremity for reciprocation therewith, spring urged coacting means on the block and rod tending to hold them for movement together whereby said block normally moves with the rod to oscillate the cam and said coacting means releasing said rod and allowing it to be reciprocated while the block remains stationary when the cam is held immovable, said cam having a peripheral slot therein adapted to receive a workpiece on the chute and move it therealong past the cam, and the cam when its slot is not positioned to receive a workpiece arresting the movement of one approaching along the chute.

6. Means for controlling the flow of workpieces along a conveyor including a gravity chute, a drive shaft mounted for rotation transversely of the chute, a crank on the drive shaft, a rod mounted at one extremity on the crank, a plate secured to the chute, a cam mounted on the plate for oscillation about an axis between opposite sides of the chute, a block coupled to the other extremity of the rod for reciprocation therewith, a pivot pin extending through the block and cam, said pin spaced radially on said cam from the cam axis, said rod and block having a spring urged ball in one of them to engage a groove in the other whereby said block is normally reciprocated with the rod and said block remains stationary when the cam is held immovable, said cam having a peripheral slot therein to receive a workpiece approaching along the chute and move it past the cam, and said cam when turned so that its slot is not opposite an approaching workpiece preventing passage thereof past the cam.

7. The combination in claim 6, including re-set screws projecting from the plate into proximity with the block to prevent oscillation of the cam when the block is not in engagement with the rod.

8. The combination in claim 6, including means on the rod for urging workpieces downward along the chute towards the cam.

9. Means for controlling the flow of workpieces along a conveyor including a conveyor, a drive shaft mounted transversely thereof for rotation, a crank on the shaft, a rod mounted at one extremity on the crank, a cam mounted on an axis for oscillation between opposite sides of the conveyor, said cam having a portion adapted to receive a workpiece and move it along said conveyor, means connecting the rod to the cam whereby reciprocation of the rod oscillates the cam, and means on the rod for urging workpieces on the conveyor towards the cam upon movement of the rod in one direction.

References Cited in the file of this patent

UNITED STATES PATENTS

| | | |
|---|---|---|
| 2,739,695 | Haycock | Mar. 27, 1956 |
| 2,827,159 | Peteler | Mar. 18, 1958 |